Oct. 10, 1939. G. RÜHL 2,175,619
REFINEMENT OF HYDROCARBONS SUCH AS BENZOL OR CRUDE OILS
Filed April 8, 1936
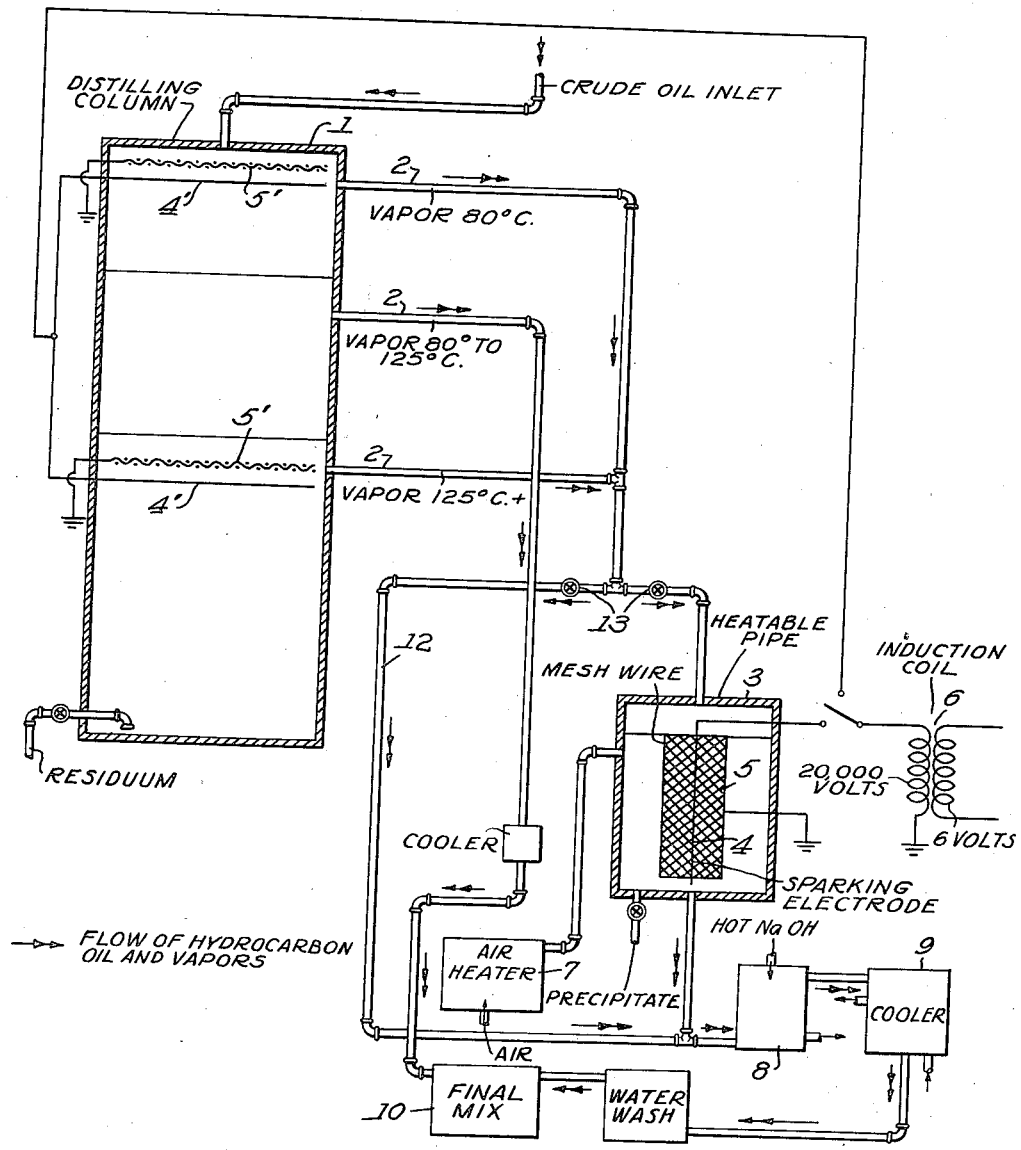
Inventor:
GERARD RÜHL
By Henry Love Clark
Attorney.

Patented Oct. 10, 1939

2,175,619

UNITED STATES PATENT OFFICE 2,175,619

REFINEMENT OF HYDROCARBONS SUCH AS BENZOL OR CRUDE OILS

Gerhard Rühl, Recklinghausen, Germany, assignor, by mesne assignments, to Koppers Company, Pittsburgh, Pa., a corporation of Delaware Application April 8, 1936, Serial No. 73,309
In Germany March 11, 1935

5 Claims. (Cl. 204—31)

The present invention relates to the refinement of hydrocarbons, such as benzol or crude oils in order to obtain such a product from the crude benzol suitable for further use, which is affected neither by the light nor by the air.

Hitherto it was usual to subject the crude benzol which is produced during the carbonisation or low-temperature carbonisation of bituminous fuels and which is recovered in large quantities in the coking industry, where it is often called "crude product", first of all to a washing with acids (for example sulphuric acid) for the purpose of refining the benzol and then to wash it with a sodium hydroxide solution so as to remove the gums and other impurities (di-olefines and alkyl-sulphide). This washing of the crude benzol involves considerable losses of valuable hydrocarbons which are formed into resins (cumaron resin), especially under the influence of the acid.

In order to avoid such losses, it has been suggested to treat the crude benzol with heat, preferably at an increased pressure. In this process, the loss of valuable hydrocarbons is less, but the carrying out of it requires an expensive high-pressure apparatus, whereby the initial costs as well as the operating expenditures of the benzol factory are unfavourably increased. The high-pressure apparatus also necessitates an increased attention, well-trained operators as well as special safeguarding precautions.

The main object of my present invention is to provide a novel method for refining the hydrocarbons, such as crude benzol, which makes it possible to avoid the high washing losses usual hitherto and the inconveniences resulting from the use of the high-pressure apparatus. This new method can be applied without any difficulty to the existing purification plants, for instance to benzol factories.

It is well known how to spray unsaturated hydrocarbons into an electrostatic field and to bring them into contact with oxidising gases, whereby a polymerisation of certain impurities takes place, which are contained in the hydrocarbons. Furthermore, it has also been tried to oxidise under a normal pressure by means of oxidising the hydrocarbon gases to such an extent that asphalt or a pitch-like material is formed, whereby the oxidising gases serve as a carrying means which favourably effects the distillation. Up till now, these methods have, however, not been applied to the refinement of hydrocarbons, such as crude benzol, since the velocity of the chemical reactions which occur, is too low for obtaining an economical utilisation of the process. While carrying out my investigations, I have found that the influence of oxidising gases upon hydrocarbons, such as crude benzol, becomes highly more intensive within an electrostatic field if the benzol flows in vapour form, preferably at a somewhat increased temperature, through the electrostatic field. In this connection I have ascertained that the reactions which take place in the electrostatic field do not relate to the compounds which I have marked as stable, that is, do not affect those compounds which are not affected by the light and by the air, but relate practically exclusively to the unstable compounds which give rise to deposits and discolourations if the benzol is exposed to air and light. I have made the observation that the effect of the oxygen upon the benzol vapours in the electrostatic field is always less after a certain duration of the process, and that after such period of time the effect of the oxygen upon the benzol vapors in the electrostatic field become quite independent of prolongation of the time of treatment, the intensity of the field and the partial pressure of oxygen, which means that only a small portion of the crude benzol, i. e., certain compounds contained in the crude benzol, is altered by the oxidation media, when the so-called gum-former test (relating to the formation of gum-like constituents) had decreased to a minimum while the residuum left over in the still when the benzol is distilled, raised to a maximum. In other words, when the unstable inherents in the benzol were oxidised or altered in a different way.

During the further development of my investigations I have found that it is not necessary to treat the whole quantity of crude benzol with oxidising gases in the electrostatic field. In most cases it will suffice, especially when dealing with light oils formed during the high-temperature carbonisation of coal, to treat the forerunning which distills over up to about 80 degrees centigrade as well as the hydrocarbons distilling over say above 125 degrees centigrade. The fractions of the crude benzol lying within the temperature range given above (about 60% by volume of the initial quantity) are usually resisting to air and light without requiring any treatment.

The process according to the present invention comprising the refinement of hydrocarbons by removing those compounds which are formed into gums if they come into contact with light and air, consists in that the hydrocarbons, i. e., the crude benzols, are evaporated and in vapour condition they are exposed to the electrical discharges, preferably in the presence of oxidising gases, such as air.

Another object of my invention consists in that the crude benzol is evaporated and only those hydrocarbons distilling over up to about 80 degrees centigrade and above 125 degrees centigrade preferably in the presence of oxidising gases such as air, are led through the electrostatic field.

In the accompanying drawing there is shown a schematic layout of apparatus for practicing the invention.

The execution of my invention is preferably done in such a way that the crude benzol being suitably dehydrated before, is distilled and the vapours mixed with oxygen or air are led through an electrostatic field. Thereupon, the vapours without any previous condensation, are treated with a sodium hydroxide solution or with another suitable alkaline and then it is condensed. Finally, the condensate is also washed with water, whereupon it presents a motor fuel which corresponds to the regulations.

According to my invention, the electrostatic field for the treatment of the crude benzol vapours is preferably arranged inside the distilling column. By this precaution, there results another advantageous effect in that practically all those proportions of the hydrocarbons which are present as a fog in the vapour chamber of the column, are precipitated which otherwise would be distilled off without being subjected to the fractionating process, which is only traversed by vapours, so that a considerably better separation of the various fractionations of the crude benzol is obtained.

This other advantageous effect of my invention can also be made use of for the distillation of pure hydrocarbons under certain conditions which it may be of such importance that the hydrocarbons pass through the electrostatic field in the absence of oxidising media.

Details with regard to the mode of carrying out my invention when dealing for example with crude benzol, are as follows:

1,000 grams crude benzol which begins to boil at a temperature of 77 degrees centigrade and of which about 93% by volume are distilled over up to about 170 degrees centigrade, are distilled in a fractionating column. This column 1 is fitted with outlets 2 at the various points of the temperature, in order to be able to discharge separately the single fractions. The crude benzol may give a so-called gum former test of 208 mg. per 100 cm.$^3$, a waste steam residuum of 45 mg. per 100 cm.$^3$ and becomes quickly darker in an open vessel. I have also found by a preliminary test that the proportions of crude benzol distilling over between about 80° C. and 125° C. such as between 79 and 123 degrees centigrade, namely about 60% by volume, were resisting to air and light and they only gave a so-called gum former test of 4.8 mg. per 100 cm.$^3$. While distilling the 1000 grams of crude benzol, the forerunning up to 79 degrees centigrade and the secondary running above 123 degrees centigrade are, therefore, separately removed from the distilling column 1 and directed from above downwards through a heatable pipe 3 in which is arranged a sparking electrode 4 in a well-known manner. At the inside of the pipe, there is fitted a cylindrical body 5 made of mesh-wire which is in connection with the earth. One pole of an induction coil 6 is likewise connected with the earth, while the other pole of the induction coil is connected to the sparkling electrode being insulated against the earth. Air carefully freed from dust particles and other impurities, is heated in a preheater 7 to a temperature of about 200 degrees centigrade and then supplied to the pipe 3 in which is arranged the sparkling electrode 4. The heated-up air is suitably introduced in such a manner that the connecting line leading into the sparkling electrode and the walls adjacent to the suspension point of the sparkling electrode, are supplied with the heated-up air. The benzol vapours are thus hindered from precipitation at the connecting line leading to the sparkling electrode and in the vicinity of same. Short circuits and the formation of sparks are thereby avoided which under certain conditions may cause considerable destruction of the apparatus. The amount of air supplied is about 5% by volume based upon the volume of the proportions distilling over, which exists during the working temperature. The induction coil is for instance operated by a primary voltage of 6 volts and by a secondary voltage of about 20,000 volts, as diagrammatically indicated, from a source of power not shown, so that in the treatment pipe, comparatively high electrical discharges are transferred from the sparkling electrode onto the cylindrical mesh-wire body. These discharges do not take the form of permanent sparks or arcs. After the vapours have passed the treatment pipe, they are directed through hot sodium hydroxide solution in tank 8 and then precipitated in a cooler 9. The so-called gum former test which gave a figure of 136 for the forerunning and of 310 for the secondary running before the treatment, is decreased to 9.2 or 3.8 respectively after the treatment. Finally, the proportions of the crude benzol distilling over between 79 and 123 degrees centigrade are combined in mixer 10 with the products which are formed during the treatment of the forerunning and of the secondary running. The mixture is water-clear and resisting to air and light. The so-called gum former test shows a figure of about 5.6. The losses resulting from the treatment carried out according to my invention, amount to about 2.5% by volume, whereas the washing losses of the same crude benzol showed a figure up to 8% by volume at the usual refining process with sulphuric acid.

In the alternative, when the electrostatic field is to be arranged inside the distilling column, then the heatable pipe arrangement (in 3) is replaced by placing the sparking electrodes in the column, as diagrammatically shown at 4' and 5'. Both arrangements are shown in the single figure, merely for convenience of illustration. Hence line 12 and valves 13 are indicated merely to show that the vapors do not pass through the heatable pipe 3, when 4' and 5' are used instead of a heatable pipe like 3.

I have above particularly described my invention in connection with the refinement of crude benzol, but my invention is not restricted in all its aspects to the refinement of crude benzol, since any other crude hydrocarbon products can also be subjected to the treatment, and advantages obtained thereby similar to those attained with the refining of crude benzol. It is, of course, understood that in such instances the different circumstances the refining process is required to accommodate when dealing with other products than with crude benzol, have to be taken into account, and the process steps must be adapted to the special qualities of the crude products, which adaptation, however, considering the above description, can be determined by an expert without any difficulty by a simple test.

The above-mentioned "gum-former test" is carried out as follows:

The benzol to be tested is filtered, the first 10 ccm. of the filtrate being discarded. 100 ccm. of the filtrate are added into a flask, fitted with a reflux cooler, and a small pipe for introducing oxygen into the liquid. A flow of oxygen is slowly passed through whereby the velocity of the oxygen flow is adjusted to 35 ccm. per minute. The oxygen has to be dried by means of a wash-bottle containing sulphuric acid, connected in front of the flask, and by means of a tower containing chloride of calcium. The strength of the oxygen flow is suitably measured by a small flow-meter, connected in front of the flask. The benzol has to be raised to the boiling point and must be kept for 3 hours boiling, whereby the oxygen flow is continuously led through by refluxing. After three hours the heating-up is stopped, the reflux cooler as well as the small pipe for leading through the oxygen are removed and the distilling bend is mounted on same. By making use of a Liebig-cooler about 80% of the benzol is distilled-off. The rest is transferred into a glass-dish, being of the semi-conical type, and the flask is flushed-out with a mixture containing 50 parts pure methyl alcohol and 50 parts pure benzol. The flushing liquor is added to the benzol rest contained in the glass-dish. The contents is steamed-off up to the highly boiling water-bath, the dish is dried in a cabinet at a temperature of 100–105° C. up to the weight constancy and the gums formed are weighed.

When carrying out this test 100 ccm. of benzol should not form more than 10 mg. of gums.

When cleaning the apparatus it must first of all be treated with concentrated sulphuric acid. Thereupon the apparatus is thoroughly washed-out with distilled water. Then follows a washing with about 10% strong sodium hydroxide solution and finally the apparatus is well flushed-out with distilled-water. The apparatus (especially the flasks) is dried by leading through cleaned air.

It can be assumed that there is a clearance of ±2 mg.

My invention as hereinabove set forth is embodied in particular form and manner but may be variously embodied within the scope of the claims hereinafter made.

I claim:

1. Process for refining benzol crudes comprising: evaporating the benzol crudes and separating the vapors distilling over below about 80° C. and between about 125° C. and about 170° C. from those distilling over between about 80° C. and about 125° C.; subjecting only the separated vapors distilled off below about 80° C. and those above about 125° C. to the influence of a high voltage electrostatic field in the presence of oxygen and thereby converting the unstable unsaturates to more stable compounds; condensing the thus treated and the untreated vapors, and combining the condensed treated vapors with the condensed untreated vapors still untreated to convert unstable unsaturates to more stable compounds.

2. Process for refining benzol crudes comprising: evaporating the benzol crudes and separating the vapors distilling over below about 80° C. and between about 125° C. and about 170° C. from those distilling over between about 80° C. and about 125° C.; subjecting only the separated vapors distilled off below about 80° C. and those above about 125° C. to the influence of a high voltage electrostatic field and thereby converting the unstable unsaturates to more stable compounds; condensing the thus treated and the untreated vapors, and combining the condensed treated vapors with the condensed untreated vapors still untreated to convert unstable unsaturates to more stable compounds.

3. Process as claimed in claim 2 and in which the vapors which have been acted upon by the electrical discharges are washed with a hot alkaline solution prior to their condensation and in which the untreated vapors are condensed and combined unwashed by alkali.

4. A process as claimed in claim 1 wherein the vapours after the treatment in the electrical field and before condensation are brought into contact with an alkaline solution at an increased temperature and thereafter condensed and water washed.

5. Process for refining benzol crudes comprising: evaporating the benzol crudes to separate the vapors distilling over below about 80° C. and between about 125° C. and about 170° C. from those distilling over between about 80 C. and about 125° C.; subjecting only the separated vapors distilled off below about 80° C. and those above about 125° C. to the influence of a high voltage electrostatic field and thereby converting the unstable unsaturates to more stable compounds; and condensing the thus treated vapors.

GERHARD RÜHL.